United States Patent [19]
Stokes

[11] Patent Number: 5,670,181
[45] Date of Patent: Sep. 23, 1997

[54] APPARATUS AND METHOD FOR SLIP CASTING FOR CERAMIC OBJECTS

[76] Inventor: Christine P. Stokes, 5280 S. 5500 West, Hooper, Utah 84315

[21] Appl. No.: 546,505

[22] Filed: Oct. 20, 1995

[51] Int. Cl.⁶ .................................................. B29C 41/16
[52] U.S. Cl. ........................... 425/84; 264/40.1; 264/86; 425/173
[58] Field of Search ........................... 425/84, 169, 173; 264/40.1, 86

[56] References Cited

U.S. PATENT DOCUMENTS 5,013,500  5/1991  Hamanaka et al. ................. 425/84

*Primary Examiner*—James P. Mackey
*Attorney, Agent, or Firm*—A. Ray Osburn

[57] ABSTRACT

A method of slip casting for the manufacture of ceramic items, wherein the wall thicknesses are accurately determined by providing confined slip pool samples which visibly solidify on an external portion of the plaster of paris mold being used. The solidification of the sample is indicative of the moist wall thickness of the object being molded, when the mold is decanted at that instant of still liquid slip.

4 Claims, 5 Drawing Sheets

APPARATUS AND METHOD FOR SLIP CASTING FOR CERAMIC OBJECTS

BACKGROUND OF THE INVENTION

1. Field

The field of the invention is producing pottery objects by the forming of clay materials, and more particularly the use of the slip casting method to produce hollow thin walled objects for subsequent firing within a kiln.

2. State of the Art

Forming moist clay into the shapes of desired objects is often done substantially by use of the fingers and hands of the ceramist. Also very common is the use of rotating potters' wheels, upon which moist clay is formed into desirable thin walled hollow objects. These manufacturing techniques utilize clay in moist but substantially solid form. In another method, the clay is utilized in the form of a pourable suspension, known as "slip", of clay particles in water. A de-flocculent is added to the suspension to prevent particle settling. The slip may be manufactured by the ceramist, but is readily available commercially in premixed form.

Used in conjunction with the slip are molds with inner surfaces shaped to form the outer surfaces of the objects being made. The molds are made of plaster of paris, which is very porous and capable of quickly absorbing large amounts of water. It is this water absorbing characteristic that is utilized in slip molding ceramic production. The slip is poured into the mold, which is allowed to rest undisturbed while the mold material absorbs water from the contacting slip all over its inside surface. This transforms the contacting slip into a firm moist wall structure of clay, which continues to thicken until the still liquid remaining slip is poured from the mold.

The prior art reveals little to aid the ceramist in knowing the moment at which to decant to achieve a desired wall thickness. The ceramist's instinctive, intuitive, or acquired feel is generally relied upon. Molds with fully open tops may be tilted to allow the thickness of the uppermost part of the wall to be gauged by the eye. In some instances, a wall sample may be taken from the top edges of such molds using a thin spatula. Neither method is highly accurate, the first depending upon the estimating ability of the eye. The second depends upon removal of an unbroken or uncrushed sample. It is questionable whether a representative sample can be taken at the upper edge of the developing wall, a location (called the "spare") at which slip must be periodically added during wall formation.

When the wall thickness is judged, by whatever method, to be that desired, the still pourable portion of the slip is decanted from the mold, which is set aside to further absorb moisture to firm the remaining wall. As it loses moisture, the wall shrinks both in thickness and in circumference, freeing itself from the mold.

The present main shortcoming in prior art techniques for slip molding is the inability of the ceramist to achieve the desired wall thickness with sufficient accuracy. Wall thickness requirements vary from quite thick to very thin. Hanging ceramic tree ornaments, for example, must have quite thin walls to avoid excessive weight.

A need therefore exists for a technique accurately indicating the correct time for decanting slip from the mold to achieve the desired wall thickness in the molded finished object.

BRIEF SUMMARY OF THE INVENTION

With the foregoing in mind, the present inventive apparatus and methods eliminate or substantially alleviate the disadvantages and shortcomings in prior art ceramic slip casting by largely removing the present difficulty in achieving desired wall thicknesses. Immediately after filling the mold with slip, a sample of the liquid filling slip of desired thickness is deposited upon a horizontal upwardly facing exterior portion of the absorptive mold body, filling a perforation provided vertically through a flat, moisture impervious slip pool dam plate placed to rest upon the mold. The sample reduces in thickness and consolidates into a moist but solid layer as water is absorbed into the mold body. The upper surface of the sample changes in appearance from watery and shiny to dull when consolidation is complete. At this time, the moist but solid wall thickness of the object inside the mold is closely identical in thickness to the sample thickness. The ceramist may decant the mold at this time knowing the moist wall thickness of the object remaining in the mold.

Slip casting an object by the inventive method comprises the major steps of placing an initial sample pool dam, of a thickness estimated to produce the desired wall thickness, upon a horizontal upward facing exterior portion of mold, simultaneously filling the mold and the sample pool dam with slip, noting the instant the upper surface of the slip sample pool changes from shiny to dull in appearance, and immediately decanting the mold of all still-liquid slip, knowing that the moist thickness of the object walls is at that instant identical to that of the sample.

The ceramist may then select a slip plate of greater or lesser thickness and repeat the above steps until the desired moist clay wall thickness is achieved.

To most ceramists, the thickness of the moist clay walls is sufficiently indicative of the final air hardened and fired wall thickness. However, some may wish to continue the process through the typical air hardening of the moist clay of the molded object, or even through the kiln fire stage, before deciding upon a second experimental casting with a slip sample dam of greater or lesser thickness. Preferably, the pool dams are prepared in sets of individually differing thicknesses, facilitating immediate selection of sample pool dam depths for producing the desired wall thicknesses.

The ceramist repeats this process until satisfied with the wall thickness of the molded piece, whether in initially moist clay, air hardened or kiln fired form. Successive objects may then be cast in the same mold without the necessity of drying, although the time required for the wall to form may be greater with successive objects. The time for conversion of the liquid slip to a moist clay layer in the slip pool dam is correspondingly long, provided care is taken to place the dam exactly at the same location on the body of the mold for successive slip castings.

BRIEF DESCRIPTION OF THE DRAWINGS

In the drawings, which represent the best modes presently contemplated for carrying out the invention.

DETAILED DESCRIPTION OF ILLUSTRATED APPARATUS AND METHODS

Figure 1:
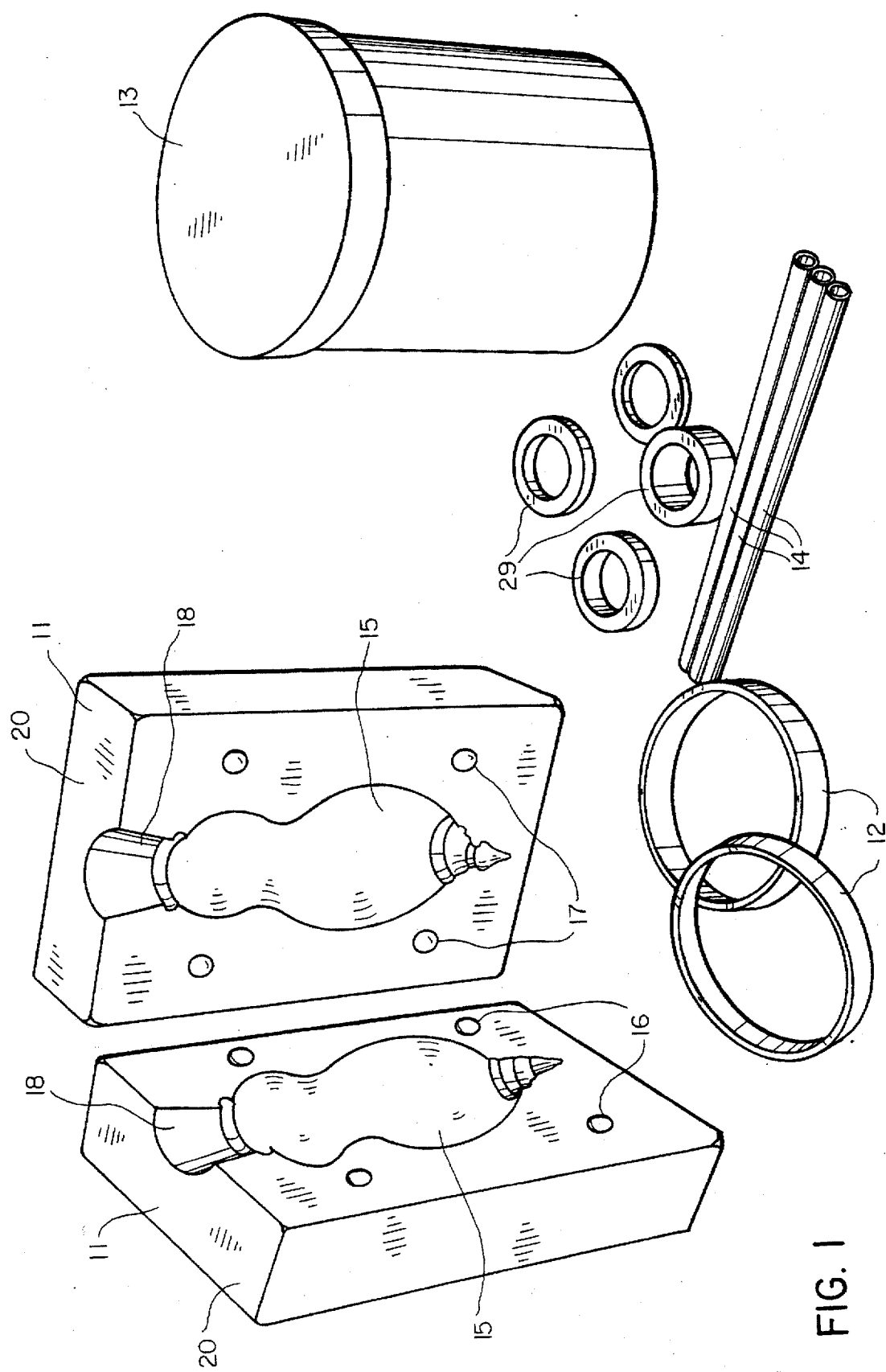
FIG. 1 is a perspective view of the various items needed to exercise the preferred inventive method of slip casting ceramic objects, drawn to a reduced scale, FIG. 2 a perspective cutaway view of a mold being utilized for slip casting a ceramic object, showing an internal cavity filled with slip and a slip pool dam being so filled, drawn to somewhat reduced scale, FIG. 3 a cross sectional view through the slip pool dam plate of FIG. 1 along with a section of the mold body, drawn to approximately full scale, FIG. 3a the slip pool dam and fragment of the body of FIG. 3, wherein the sample of slip has been converted to a layer of moist solidified clay, drawn to the scale of FIG. 3, FIG. 3b a drawing of an alternative apparatus for confining the slip pool sample, comprising a recess built into the top surface of the mold, drawn to the scale of FIG. 3, FIG. 3c a cross sectional view through a slip sample placed unconfined upon the upper surface of the mold, drawn to the scale of FIG. 3, FIG. 4 a representation of a prior art method of determining the slip wall buildup within an open top mold, drawn to essentially full scale, FIG. 5 a representation of a prior art method of determining the wall buildup by taking a sample from the top of an open top mold for visual observation or measurement, drawn to the scale of FIG. 4, FIG. 6 a perspective representation of a group of slip mold dams simultaneously molded in incrementally differing multiple thicknesses and attached together with tear strips, drawn to a reduced scale, FIG. 7 a perspective representation of a group of separately constructed slip pool dams, drawn to a reduced scale, and FIG. 8 a perspective representation of slip being decanted from a mold, drawn to a reduced scale.

The various articles needed for slip casting of a ceramic object by the inventive method and apparatus include a plaster of paris female mold 11 (two-part in this example), elastic bands 12 for securing the mold parts together, a container of slip 13 and a slip sample pool dam 29. Ordinary soda straws 14 are also useful, as later described. (FIG. 1)

The two parts of mold 11 are secured together by bands 12 to enclose an internal cavity 15, indexed by mating dimples 16 and knobs 17. In this example, the mold parts include an uppermost filling funnel portion 18, terminating slightly above the main object forming portion of cavity 15.

Slip 13 is a mixture of powdered clay particles in water, stabilized against settling by one or more de-flocculents. Sodium silicate or soda ash, alone or in combination, are commonly used. Slip 13 is quite thin, typically comprised by weight of about ⅓ water and ⅔ powdered clay. When poured through funnel 18 to fill mold 11 to upper surface 20 even internal niches 19 are filled uniformly.

Figure 2:
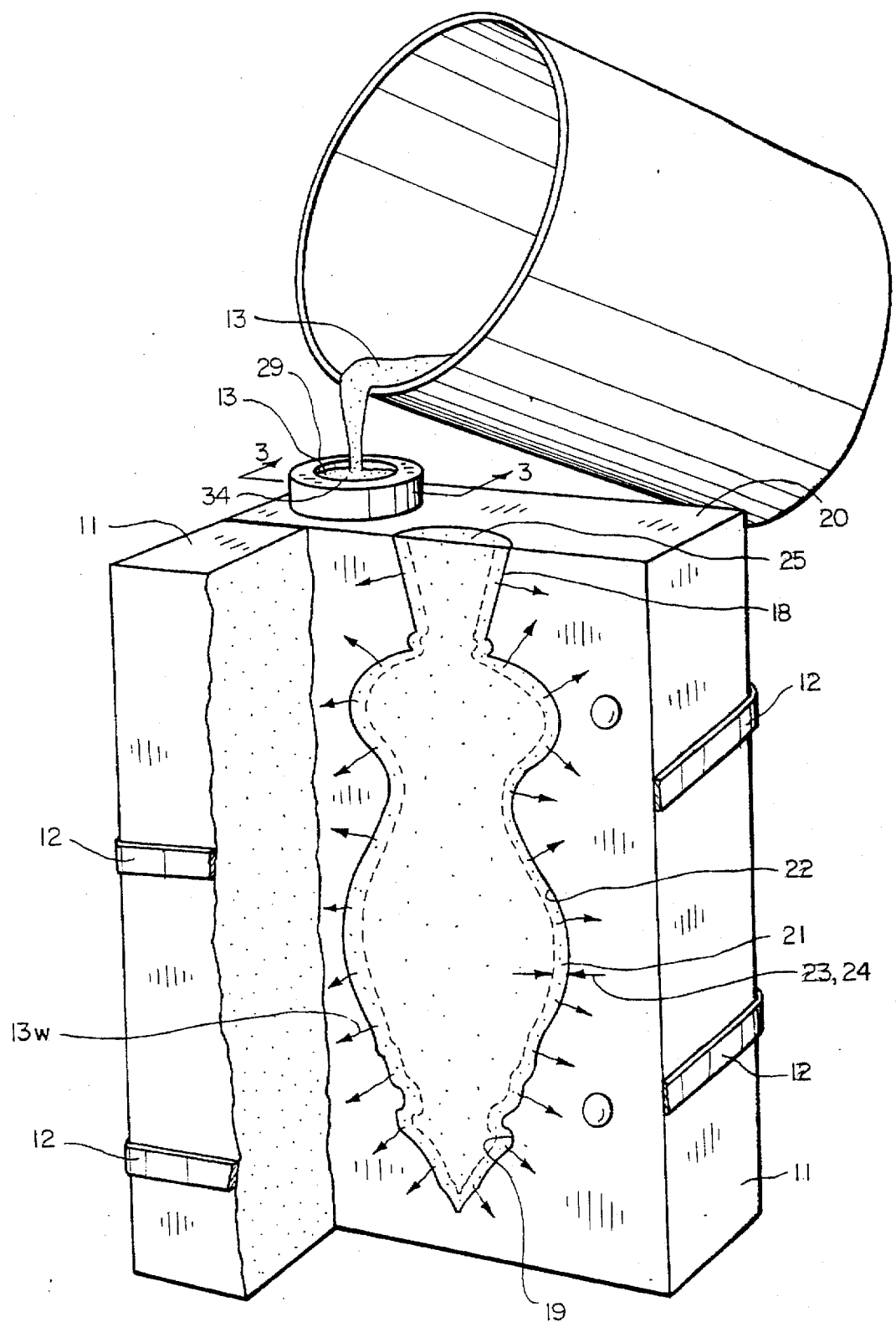

The porous plaster of paris material of mold 11 immediately begins drawing water from the contacting layer of slip all over the inwardly facing surface 22 of cavity 15. (arrows 13w) With loss of water, the clay particles of slip layer 21 adjacent the mold wall pull together into a moist but firm clay rich layer 23. (FIG. 2) With continued passage of time, the water is drawn more deeply from the liquid slip 13, and layer 23 increases in thickness 24. As water is extracted by the plaster of mold 11, the volume of slip 13 in cavity 15 decreases, causing upper surface 25 in funnel 18 to lower. Replacement slip is added to maintain the level of surface 25 well above funnel bottom 26, so that solid layer 23 may build uniformly all over cavity 15.

Figure 8:
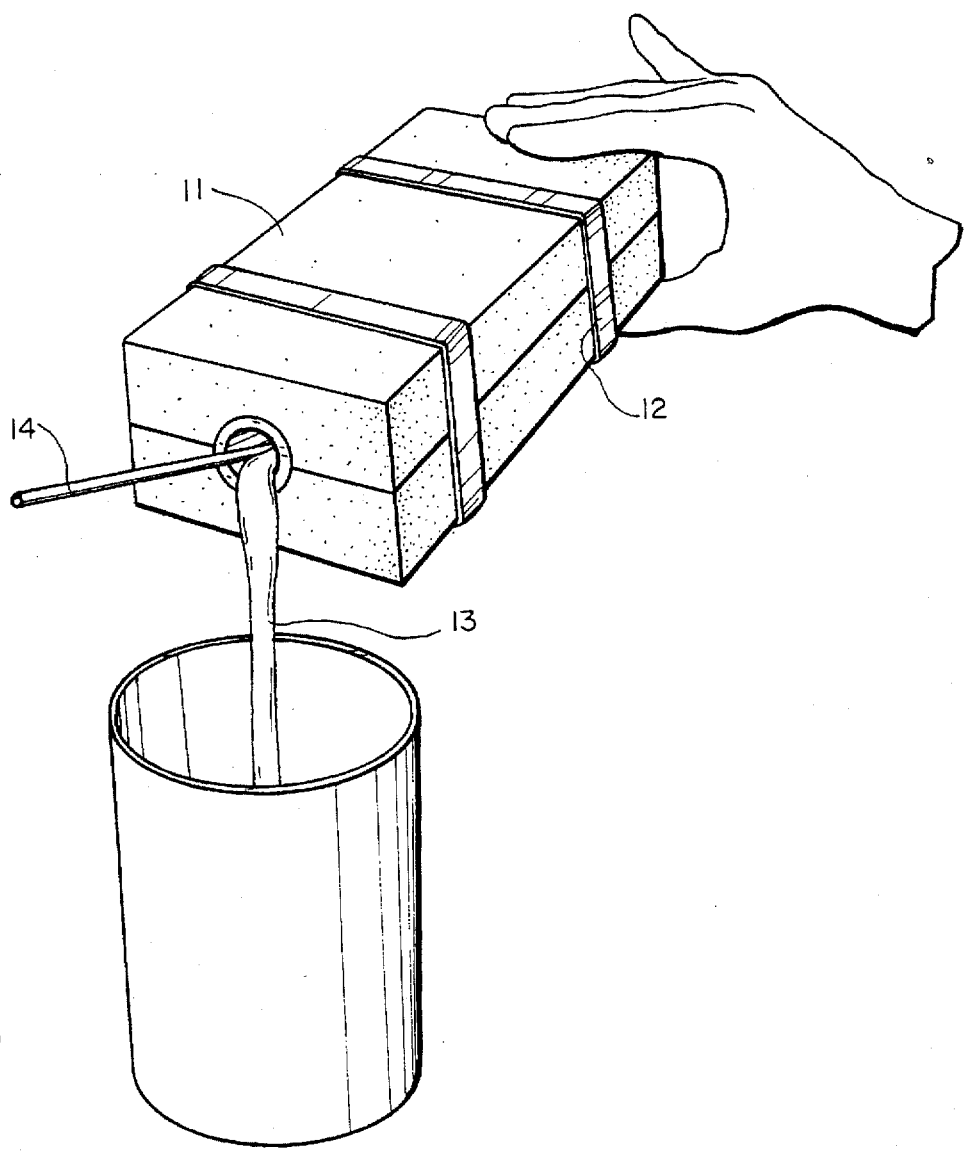

When clay rich layer 23 increases to a desired thickness 24 upon the inside surface of mold cavity 15, the still liquid slip 13 in the center of the cavity is decanted and retained for future use. One of the aforementioned soda straws 14 may be used to break the vacuum within the cavity 15 so that the liquid slip 13 pours smoothly. (FIG. 8) Mold 11 is then allowed to stand, further solidifying, shrinking and strengthening layer 23 by continued moisture absorption by the material of the mold. Elastic bands 12 may then be removed and the mold part separated from around the solidified, but still moist and fragile object being manufactured. More moisture is lost to the atmosphere before the object is eventually smoothed as necessary to remove mold marks and fired in a kiln, not shown, in bisque or with selected glazing for appearance. During kiln firing, both the wall thickness 24 and the external dimensions of the molded object further decrease, as the object is transformed into ceramic by the application of heat. The final object is substantially smaller than cavity 15.

The above brief description of the slip casting process does not explain how the ceramist is able to determine when the growing clay rich layer 23 reaches a desired thickness 24. Prior art methods are sometimes based upon "educated guesses" of the rate of layer buildup based upon experience. However the effects of so many factors are involved, all of which must be integrated consciously or otherwise, that this is an inherently inaccurate method of deciding the point in time to decant the mold. Molds vary in absorptivity and initial moisture content, slip compositions vary in water content, and clays from various sources coalesce at differing water contents.

Figure 4:
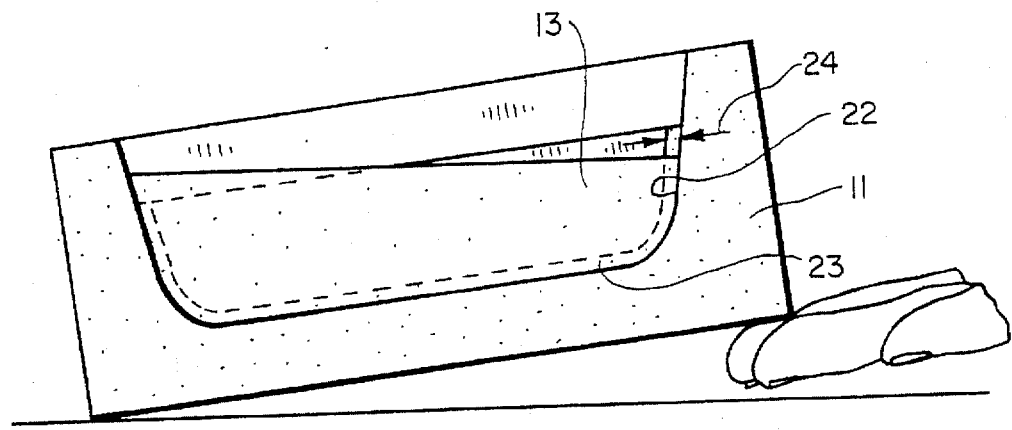
Figure 5:
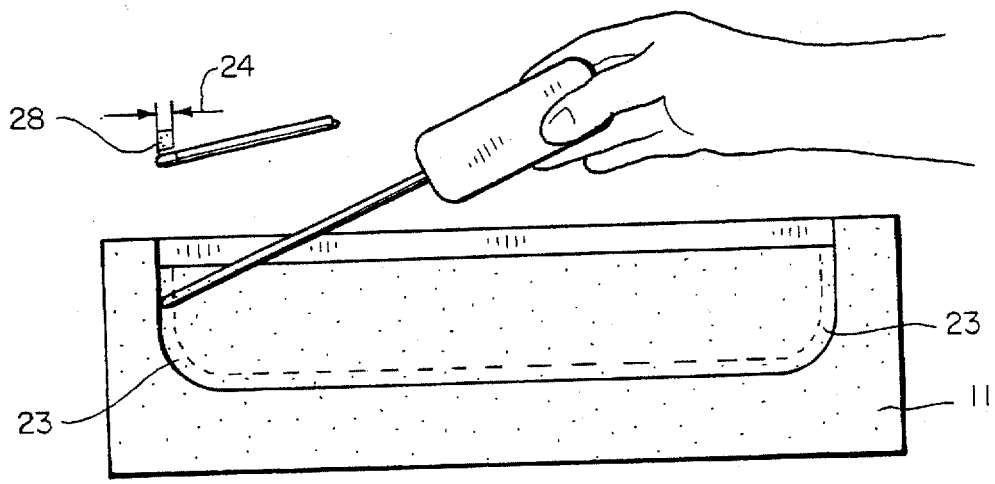
Figure 6:
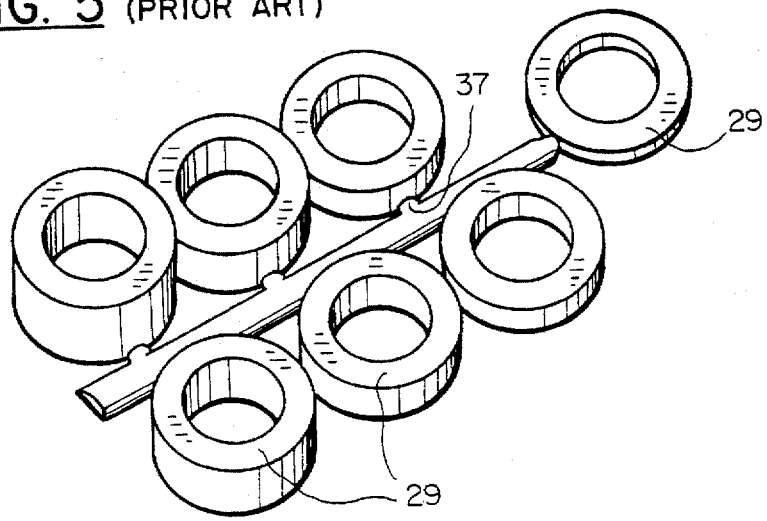

When the mold configuration employed permits, the wall thickness determination may be made visually, perhaps with somewhat greater accuracy. An open-top mold 27 for a bowl may, for example, be tilted to reveal the wall thickness to the eye. (FIG. 4) With another prior art method, a small sample 28 of the layer 23 is removed from the mold, so that thickness 24 may be visually gauged or otherwise measured. (FIG. 5) The mold tilting method can only be used with compatible mold shapes, and requires visual estimating of thickness 24. The sampling above described also requires manual access to at least the upper portion of the interior of the mold, and in any event often damages the wall locally. More importantly, these methods are difficult to implement and are unreliable and are incapable of producing uniform predictable wall thicknesses for the successively molded objects.

With the inventive method of slip casting, a slip pool dam 29 is used to directly indicate a point in time at which the slip layer thickness 24 within mold 11 has reached a specific thickness. Slip dam 29 comprises a plate member 30 with a flat bottom surface 32, a flat upper surface 33 and a preferably circular vertical perforation 31. (FIGS. 1–3, 6 and 7)

Figure 3A:
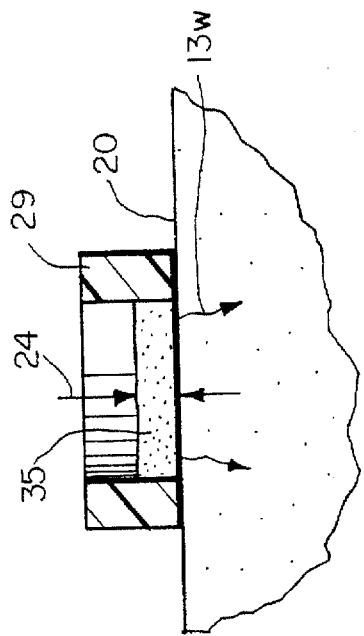

Slip dam 29 is placed with bottom surface 32 resting upon a flat, horizontal, mold body upper surface 20, and perforation 31 is filled to plate upper surface 33 with slip 13, immediately after cavity 15 is completely filled. This provides a liquid slip sample 34 the thickness of plate 30, pooled upon plaster of paris surface 20 of mold 11. Thus, the visible slip sample 34 and underlying mold surface 20 replicate the hidden slip-mold surface relationship in internal cavity 15. As moisture is drawn from interior wall contacting slip 21 through mold wall surface 22 into the body of mold 11 to form solidified clay rich layer 23, moisture is simultaneously drawn from slip pool 34, which is converted into a moist solid layer 35 upon upper mold surface 20 of the same thickness as the layer formed all about the surface 22 of cavity 15. (FIG. 3a) At this point, the liquid slip 13 is decanted from the cavity of mold 11, leaving an internal wall layer 23 of the thickness indicated by the thickness of the now moist solid sample 35 contained within perforation 31 upon upper surface 20 of mold 11.

The free surface 36 of pooled liquid slip sample 34 in perforation 31 initially has a surface which is watery and shiny in appearance, which however turns dull immediately upon removal of moisture from the full thickness of the pool 34. This provides a visual indication for the ceramist of the instant that the inside wall thickness is the same as the thickness of solidified sample 35. Slip dams 29 are preferably provided in various incrementally differing thicknesses to be selected for desired corresponding wall thicknesses of the objects being manufactured. (FIG. 6) The thickness of the initial slip sample 34 within perforation 31 decreases substantially as water is drawn from it into the material of mold 11. However, the resulting thickness, and the decrease in thickness are all readily visible, so that the ceramist may decant knowing very closely the moist wall thickness of the object being molded.

The ceramist must initially select a slip sample dam 29 of a thickness estimated, allowing for shrinkage, to correspond to the desired wall thickness of the object being cast. After initially proceeding with the above indicated steps of filling mold 11 and slip dam 29 with liquid pool sample 34 of slip 13, noting the instant of solidification of sample 34, immediately decanting the mold and later removing the moist clay object, the ceramist may note that the wall thickness is greater or less than desired. Some ceramists however may prefer to carry the process through the air hardening and kiln firing steps before deciding whether the wall thickness is as desired. Then, a slip pool dam 29 with plate 30 of a different thickness is selected and the entire process repeated, as often as the ceramist feels to be necessary to select the slip pool plate thickness for use in successive castings of the object.

In some circumstances, the above described repetitive series of steps to select the proper dam 29 may be shortened. For example two or more thicknesses of slip pool dam 29 may be tested simultaneously even before filling cavity 15. These castings provide data for confident selection among dam thicknesses. However, the mold 11 must have an upper facing horizontal surface large enough to accommodate the dams 29 and to provide at least one unused space for the dam selected to be used for subsequent successive castings of the object. A single mold may be used for subsequent casting without delay for mold drying, although more time is required for water absorption from the slip to form the wall 24 with each successive use. For each subsequent casting, dam 29 must be placed identically upon mold surface 20, to remain indicative of internal conditions in mold cavity 15.

The individual ceramist may find other methods of utilizing the clear visual indication of the otherwise hidden, invisible progressive wall buildup within cavity 15 provided by use of slip dam 29.

Figure 7:
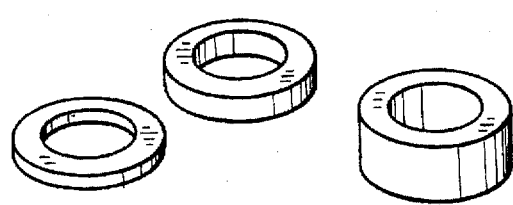

For convenience, slip dams 29 with various thicknesses of plate 30 may be constructed of water impervious polyethylene using multi-cavity molds. (FIG.6) To avoid loss and facilitate selection, groups of seven dams may be molded at once, for example, each dam having a different thickness, and all dams connected by plastic tear strips 37. However, slip dam 29 may if preferred to be otherwise embodied, such as in thin cylindrical rings. (FIG. 7)

Figure 3C:
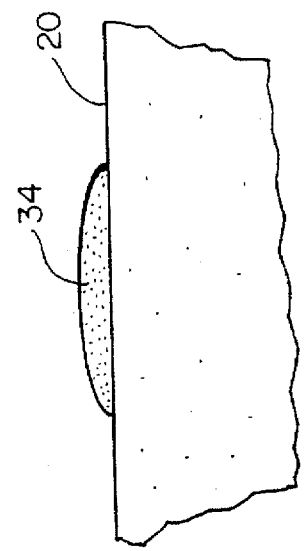
Figure 3:
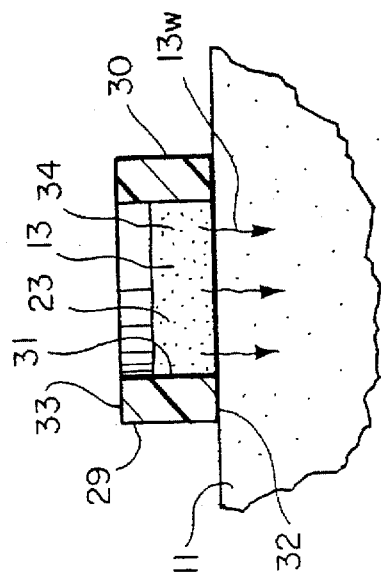

A method wherein sample 34 is placed directly, unconfined, upon mold surface 20 is also within the spirit of the invention. Although much less precise, employing this method would nevertheless provide very useful information as to the slip solidification time requirements useful in indicating internal wall buildup. (FIG. 3c)

Figure 3B:
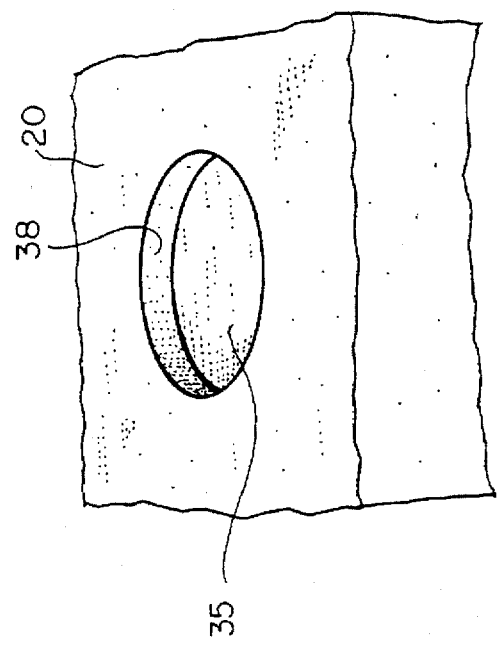

Another variation within the spirit of the invention comprises the construction of a slip sample damming recess 38 directly into the mold surface 20 (FIG. 3b) Again, valuable information would be obtained, albeit less precisely than that obtained with the use of separate sample dams.

The inventive apparatus may be embodied in other specific forms, and the method in other specific steps, without departing from the spirit or essential characteristics thereof. The present apparatus and method are therefore to be considered illustrative and not restrictive, the scope of the invention being indicated by the appended claims rather than by the foregoing description and all changes which come within the meaning and range of equivalency of the claims are therefore to be embraced therein.

What is claimed and desired to be secured by United States Letters Patent is:

1. An apparatus for successively slip casting hollow ceramic objects, the walls of successive ones thereof being consistently of a single preselected thickness, said apparatus comprising:

a mold having a body of plaster of paris with a cavity therein defining the exterior surface of the object, the body of the mold having an exterior surface with an upwardly facing horizontal portion;

a quantity of liquid slip at least sufficient for casting a desired number of objects; and means for successively confining visible liquid pool samples of unvarying thicknesses upon a selected area of the upwardly facing horizontal portion of the body surface.

2. The slip casting apparatus of claim 1, wherein the sample confining means is a slip pool dam, comprising:

a body of water impervious material of constant vertical thickness having a sample receiving perforation vertically therethrough, said body resting with a bottom surface thereof upon the selected area of the mold body.

3. The slip casting apparatus of claim 1, wherein the pool sample confining means comprises:

a recess of constant depth extending downwardly into the mold body from the selected area of the horizontal portion of the surface thereof.

4. An apparatus for successively slip casting hollow ceramic objects, the wall of successive ones thereof being consistently of a single preselected thickness, said apparatus comprising:

a mold having a body of plaster of paris with a cavity therein defining the exterior surface of the object, the body of the mold having an exterior surface with an upwardly facing horizontal portion;

a quantity of liquid slip at least sufficient for casting a desired number of objects;

an assemblage of slip sample pool dams of various individual thicknesses; each comprising a body of water impervious material of constant vertical thickness having a sample receiving perforation vertically therethrough, said body having a bottom surface adapted to rest upon the selected area of the mold body.

* * * * *